(12) United States Patent
Lee et al.

(10) Patent No.: US 8,115,750 B2
(45) Date of Patent: Feb. 14, 2012

(54) BASE CAPACITANCE COMPENSATION FOR A TOUCHPAD SENSOR

(75) Inventors: Wen-Kai Lee, Kaohsiung (TW); Tso-Chieh Yang, Chingshuei Township, Taichung County (TW); Chen-Yao Yang, legal representative, Chingshuei Township, Taichung County (TW)

(73) Assignee: Elan Microelectronics Corporation, Hsinchu (TW)

( * ) Notice: Subject to any disclaimer, the term of this patent is extended or adjusted under 35 U.S.C. 154(b) by 749 days.

(21) Appl. No.: 11/523,526

(22) Filed: Sep. 20, 2006

(65) Prior Publication Data

US 2007/0070049 A1    Mar. 29, 2007

(30) Foreign Application Priority Data

Sep. 23, 2005   (TW) ............................. 94133165 A

(51) Int. Cl.
*G06F 3/041*    (2006.01)
(52) U.S. Cl. ..................... 345/174; 178/18.06
(58) Field of Classification Search .......... 345/156–162, 345/173–179; 178/18.01–19.07, 18.06; 324/663
See application file for complete search history.

(56) References Cited

U.S. PATENT DOCUMENTS

| 5,283,559 | A | * | 2/1994 | Kalendra et al. | 345/156 |
| 5,463,388 | A | * | 10/1995 | Boie et al. | 345/174 |
| 5,495,077 | A | * | 2/1996 | Miller et al. | 345/173 |
| 5,648,642 | A | * | 7/1997 | Miller et al. | 178/18.06 |
| 5,792,997 | A | * | 8/1998 | Fukuzaki | 345/174 |
| 5,841,078 | A | * | 11/1998 | Miller et al. | 345/173 |
| 6,781,577 | B2 | * | 8/2004 | Shigetaka | 345/173 |
| 7,466,307 | B2 | * | 12/2008 | Trent et al. | 345/173 |
| 2002/0039092 | A1 | * | 4/2002 | Shigetaka | 345/156 |
| 2003/0067451 | A1 | * | 4/2003 | Tagg et al. | 345/174 |
| 2005/0024065 | A1 | * | 2/2005 | Umeda et al. | 324/663 |
| 2006/0267953 | A1 | * | 11/2006 | Peterson et al. | 345/173 |

* cited by examiner

*Primary Examiner* — Chanh Nguyen
*Assistant Examiner* — Adam J Snyder
(74) *Attorney, Agent, or Firm* — Rosenberg, Klein & Lee

(57) ABSTRACT

For a compensation to the sensed capacitive values of a touchpad sensor, the variance profile of the base capacitance or the sensed capacitive values of the traces in the touchpad sensor is determined, and then a firmware operation based on the variance profile is carried out to modify the sensed capacitive values or the position value when an object touches on the touchpad sensor, such that the touchpad sensor operates as a symmetrical touchpad sensor does.

11 Claims, 8 Drawing Sheets

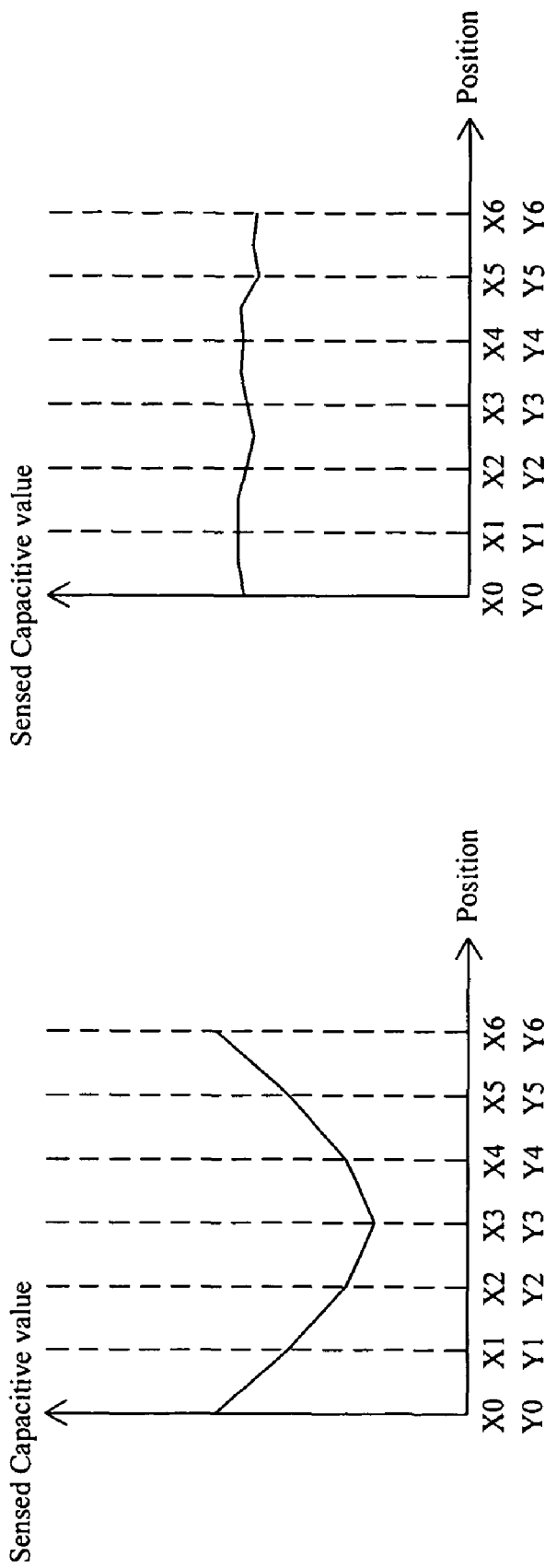

BASE CAPACITANCE COMPENSATION FOR A TOUCHPAD SENSOR

FIELD OF THE INVENTION

The present invention is related generally to a touchpad and, more particularly, to a compensation to sensed capacitive values of a touchpad sensor.

BACKGROUND OF THE INVENTION

Touchpad has been widely used in various electronic products, for example notebook computer, personal digital assistant (PDA), mobile phone and other electronic systems. Touchpad serves as an input device where users could touch or slide thereon by an object, for example finger or fingers, to control the cursor on a window in relative movement or absolute coordinate movement to support various input functions such as text writing, window scrolling and button pressing. Conventionally, the sensor of a touchpad has symmetrical structure such as the square shape shown in FIG. 1. The traces of the touchpad sensor all have same shape and area, and thus the base capacitances of the traces are symmetrically distributed across the touchpad sensor. The sensed capacitive values caused by an object touching on the touchpad sensor are also symmetrical and linear across the touchpad sensor as shown in FIG. 2. However, the shape and structure of a touchpad sensor would be changed with different applications and produces asymmetrical sensing characteristics accordingly. An asymmetrical touchpad sensor refers to one including at least one of the features of the touchpad sensor, such as the shape of the sensor, the thickness of each sensing layer in the sensor, the area of the traces, and the distances between the traces to the grounding layer, that is asymmetrical. In a touchpad sensor, the base capacitance of a trace is proportional to the area of the trace and the inverse of the distance between the trace and the grounding layer, or simply represented by $$C = \epsilon \times (A/d) \qquad \text{(Eq-1)}$$

where C is the base capacitance of the trace, $\epsilon$ is the dielectric constant, A is the area of the trace, and d is the distance between the trace and the grounding layer. The sensed capacitive value of the trace caused by an object is $$S \propto (\Delta C/C) \qquad \text{(Eq-2)}$$

where $\Delta C$ is the differential capacitance of the trace caused by the object. Therefore, the area of the trace and the distance between the trace and the grounding layer both are factors of determining the base capacitance of the trace. For example, in a circular touchpad sensor 100 shown in FIG. 3, the traces X0 to X6 along the horizontal direction have different lengths and different areas. From the equation Eq-1 it is conducted that, if all the traces of a touchpad sensor are spaced from a grounding layer with a same distance, the trace having greater area will have greater base capacitance. Accordingly, the base capacitances of the group of traces X0 to X6 and the group of traces Y0 to Y6 are asymmetrically distributed across the touchpad sensor 100. As illustrated by the equation Eq-2, when an object operating on the touchpad sensor 100, the sensed capacitive value S will vary with position across the touchpad sensor 100 as shown in FIG. 4, since the traces X0 to X6 and Y0 to Y6 of the touchpad sensor 100 have different base capacitances therebetween. The asymmetricity and non-linearity of the sensed capacitive value S will cause the touchpad having misjudgment to an operation or undesired offset in the judged position to a touch of an object operating thereon.

Therefore, it is desired a compensation to the sensed capacitive values of a touchpad sensor.

SUMMARY OF THE INVENTION

An object of the present invention is directed to methods for providing compensation to the sensed capacitive values of a touchpad sensor, such that the resulted sensed capacitive values caused by the variance between the base capacitances of different traces in the touchpad sensor becomes uniform in response to the object operation with the touchpad sensor.

In a first embodiment according to the present invention, a compensation to the sensed capacitive values of a touchpad sensor comprises the steps of: (a) calculating the base capacitances of the traces in the touchpad sensor to thereby determine the distribution of the base capacitances across the touchpad sensor, (b) analyzing the distribution to thereby determine the variance profile of the base capacitances, and (c) proceeding firmware operation based on the variance profile to modify the sensed capacitive values such that they look like the sensed capacitive values produced from a touchpad sensor having uniform base capacitances. These steps will result in an asymmetrical touchpad sensor to produce the sensed capacitive values as a symmetrical touchpad sensor does, which are symmetrically and linear. The firmware operation may comprise some arithmetic operations to the real sensed capacitive values, or adjustment of the charge/discharge frequency or current for the traces.

In a second embodiment according to the present invention, a compensation to the sensed capacitive values of a touchpad sensor comprises the steps of: (a) calculating the position value of the object on the touchpad sensor, (b) calculating the variance profile of the sensed capacitive values resulted from the asymmetrical traces in the touchpad sensor, and (c) proceeding firmware operation based on the variance profile to modify the position value so as to eliminate the offset in the position value resulted from the asymmetrical traces. The firmware operation may comprise to increase or decrease the calculated position value.

With the firmware operation, for example arithmetic operations to the sensed capacitive values of the traces or adjustment of the charge/discharge frequency or current for the traces, the sensed capacitive values of the traces on the same sensing layer or on the different sensing layer are modified as a symmetrical touchpad sensor will produce in response to object operations. With the firmware operation based on the variance profile of the sensed capacitive values resulted from the asymmetrical traces to eliminate the offset in the position value resulted from the asymmetrical traces, the touchpad sensor can keep away from incorrect determination of object operations or touched positions.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which:

FIG. 7 shows a distribution of the sensed capacitive values of the traces in the asymmetrical touchpad sensor of FIG. 6;

FIG. 8 shows a distribution of the sensed capacitive values of the traces in the asymmetrical touchpad sensor of FIG. 6 after modified by firmware operation.

DETAILED DESCRIPTION OF THE INVENTION

Figure 1:
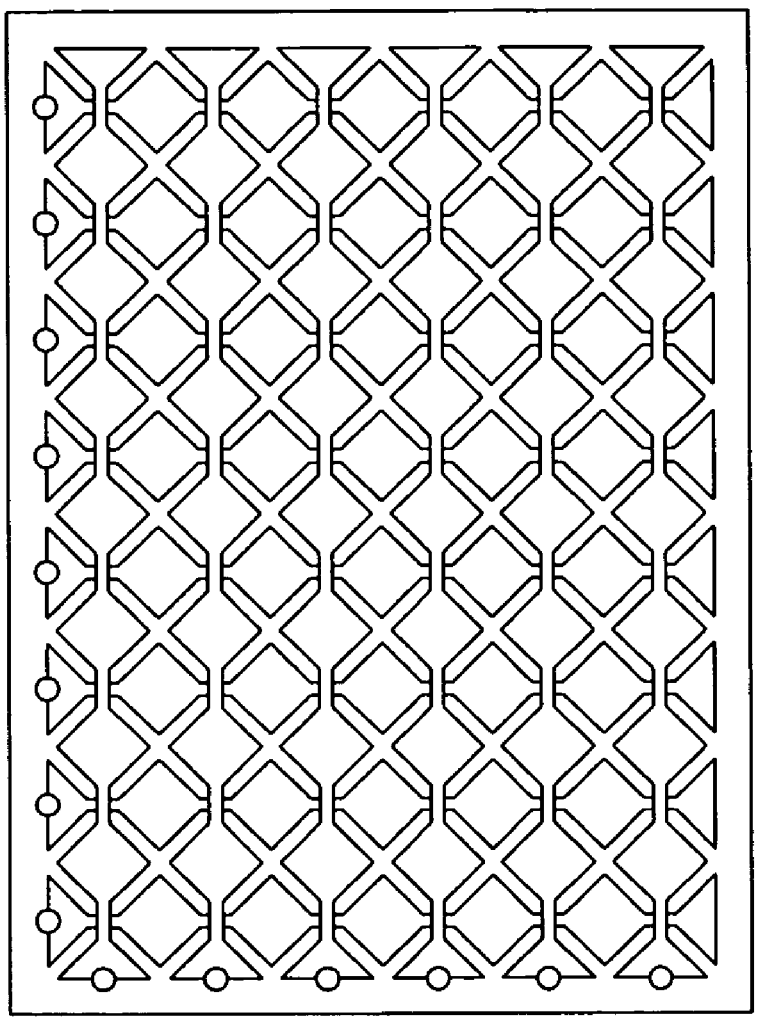
FIG. 1 shows a top view of a square touchpad sensor.
Figure 2:
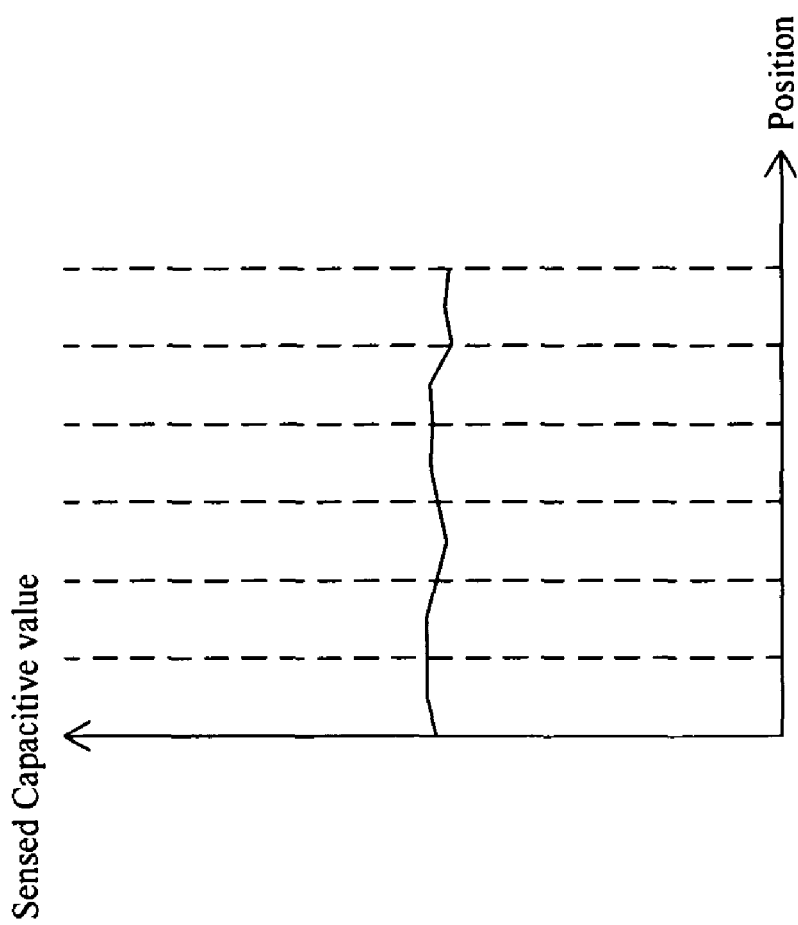
FIG. 2 shows a relationship of the sensed capacitive values caused by an object with the position across the touchpad sensor of FIG. 1.
Figure 3:
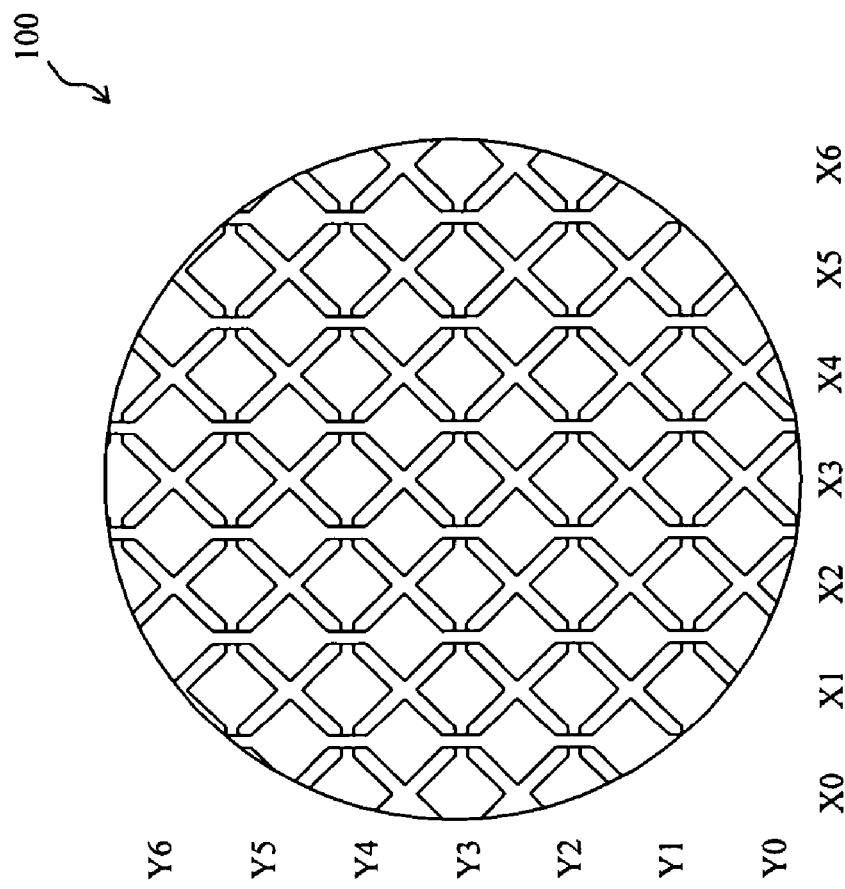
FIG. 3 shows a top view of a circular touchpad sensor.
Figure 4:
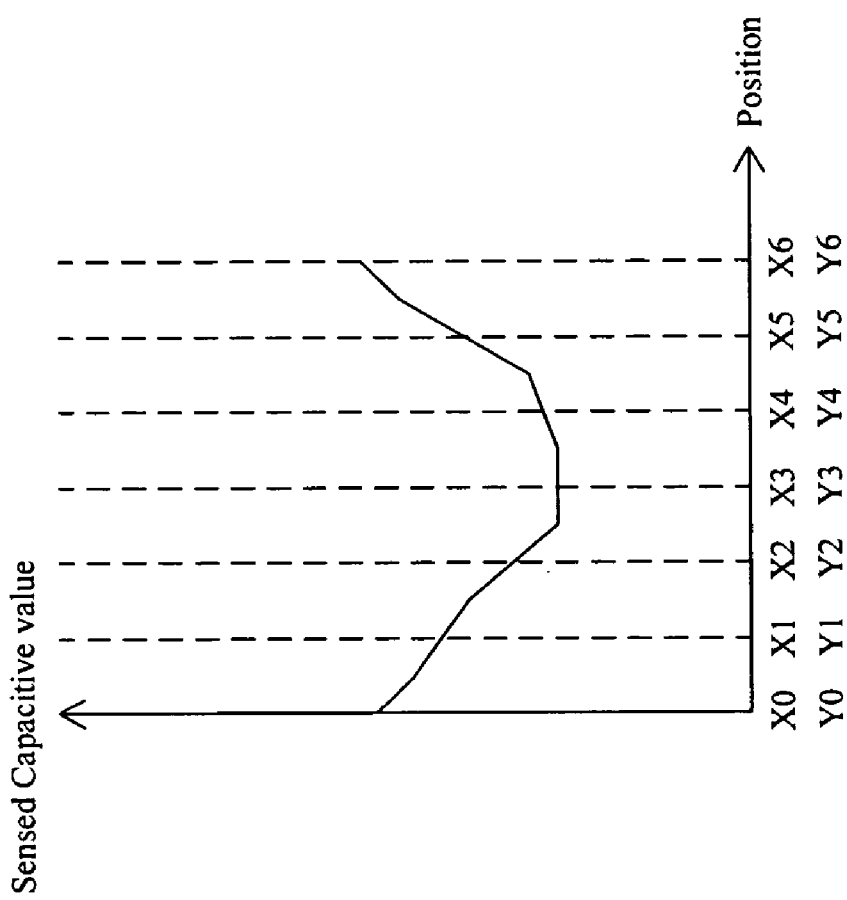
FIG. 4 shows a relationship of the sensed capacitive values caused by an object with the position across the touchpad sensor of FIG. 3.
Figure 5:
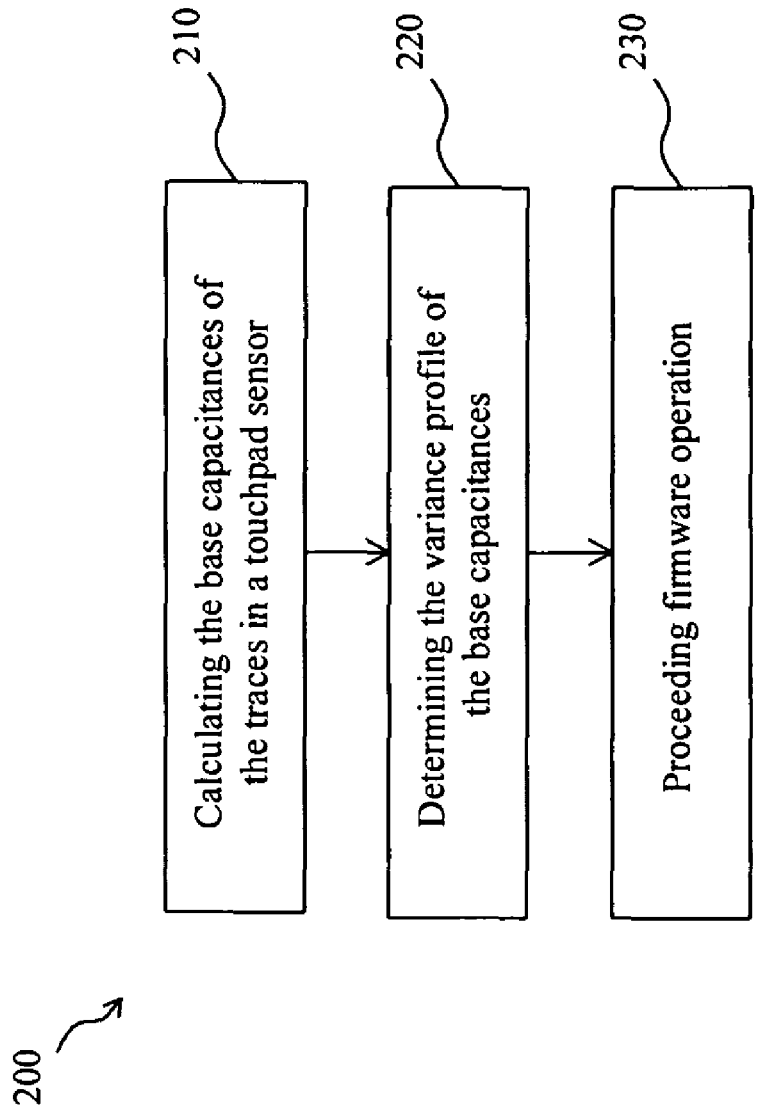
FIG. 5 shows a flowchart in a first embodiment according to the present invention.
Figure 6:
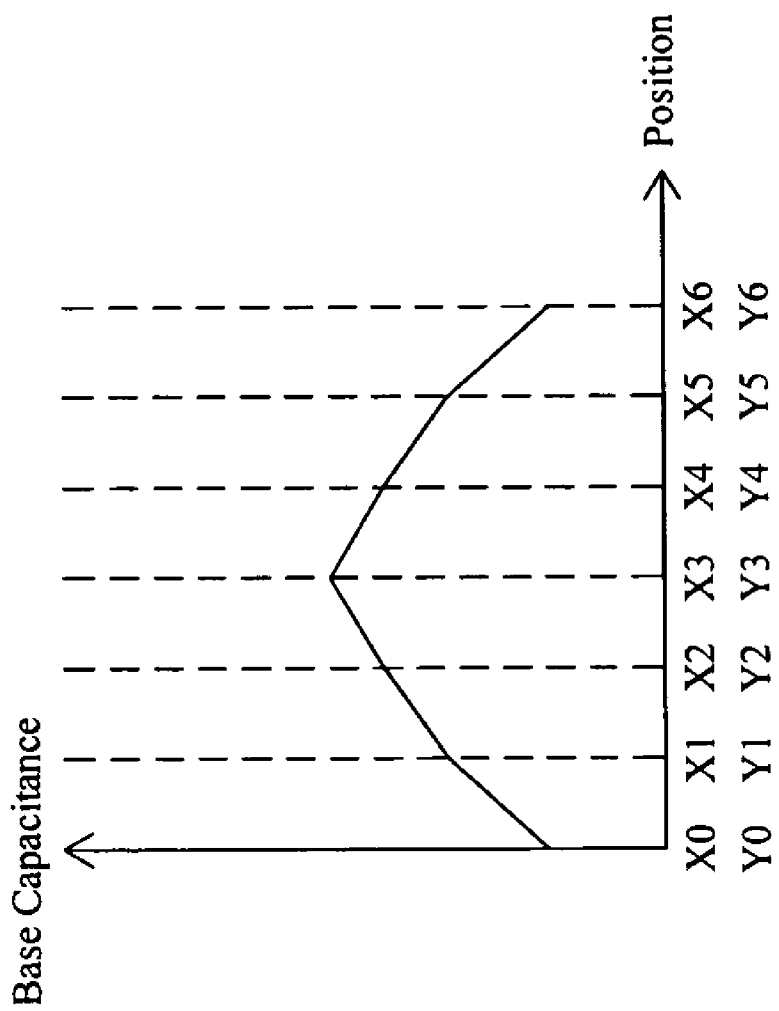
FIG. 6 shows a distribution of the base capacitances of the traces in an asymmetrical touchpad sensor.

FIG. 5 shows a first embodiment according to the present invention. In a flowchart 200 to determine the sensed capacitive values of the traces in a touchpad sensor, base capacitance calculation step 210 calculates the base capacitances of the traces in the touchpad sensor according to the equation Eq-1 and thereby obtains the distribution of the base capacitances across the touchpad sensor, distribution analysis step 220 profiles the variance in the base capacitances from the distribution, which indicates how the base capacitances of the traces are non-uniform, and firmware operation step 230 modifies the sensed capacitive values of the traces based on the variance profile such that the determined sensed capacitive values are the same as a symmetrical touchpad sensor produces. For illustrating in further detail, the following description will use the circular touchpad sensor 100 of FIG. 3 as an example, which has the group of traces X0 to X6 and the group of traces Y0 to Y6 perpendicular to each other. When employing the process 200 of FIG. 5 to the touchpad sensor 100, the base capacitances of the traces X0 to X6 are first calculated according to the equation Eq-1, and the distribution of them is shown in FIG. 6 for example. From the equation Eq-2, when an object touches on the touchpad sensor 100 at different positions, the sensed capacitive values produced by the traces X0 to X6 will be non-uniform, and as shown in FIG. 7, the sensed capacitive value of the trace X3 will be the minimum when it is touched, since this trace X3 has the maximum base capacitance among the traces X0 to X6. The less the base capacitance a trace has, the great the sensed capacitive value it will produce. However, with the variance profile of the base capacitances analyzed from the distribution of FIG. 6, it may modify the sensed capacitive values of the traces X0 to X6 shown in FIG. 7 to be with a substantially flat curve as shown in FIG. 8, for example by use of the difference ratio in the base capacitance between two traces or a normalized value. The same process is performed to the traces Y0 to Y6 such that they will be with a substantially flat curve as shown in FIG. 8. With such compensation, the sensed capacitive values of the touchpad sensor 100 become symmetrical and linear as a symmetrical touchpad sensor owns when operating with the touchpad sensor 100. In one embodiment, the firmware operation comprises arithmetic operations to the sensed capacitive values based on the variance profile of the base capacitances of the traces. For example, addition or multiplication operations are carried out for the traces X2, X3, X4, Y2, Y3, and Y4 which have less sensed capacitive values (i.e., greater base capacitances), or subtraction or division operations are carried out for the traces X0, X1, X5, X6, Y0, Y1, Y5, and Y6 which have greater sensed capacitive values (i.e., less base capacitance), and therefore the sensed capacitive values of the group of traces X0 to X6 and the sensed capacitive values of the group of traces Y0 to Y6 both become symmetrical and linear when the touchpad sensor 100 is operated with. In another embodiment, based on the variance profile of the base capacitances of the traces X0 to X6 and Y0 to Y6, the firmware operation comprises adjustment of the charge/discharge frequency for one or more of the traces X0 to X6 and Y0 to Y6. For example, it is increased the charge/discharge frequency for the traces X2, X3, X4, Y2, Y3, and Y4 which have less sensed capacitive values (i.e., greater base capacitances), or decreased the charge/discharge frequency for the traces X0, X1, X5, X6, Y0, Y1, Y5, and Y6 which have greater sensed capacitive value (i.e., less base capacitances), and therefore the sensed capacitive values of the group of traces X0 to X6 and the sensed capacitive values of the group of traces Y0 to Y6 both become symmetrical and linear as a symmetrical touchpad sensor owns when operating with the touchpad sensor 100. In yet another embodiment, based on the variance profile of the base capacitances of the traces X0 to X6 and Y0 to Y6, the firmware operation comprises adjustment of the charge/discharge current for one or more of the traces X0 to X6 and Y0 to Y6. For example, it is increased the charge/discharge current for the traces X2, X3, X4, Y2, Y3, and Y4 which have less sensed capacitive values (i.e., greater base capacitances), or decreased the charge/discharge current for the traces X0, X1, X5, X6, Y0, Y1, Y5, and Y6 which have greater sensed capacitive value (i.e., less base capacitances), and therefore the sensed capacitive values of the group of traces X0 to X6 and the sensed capacitive values of the group of traces Y0 to Y6 both become symmetrical and linear as a symmetrical touchpad sensor owns when operating with the touchpad sensor 100.

Figure 9:
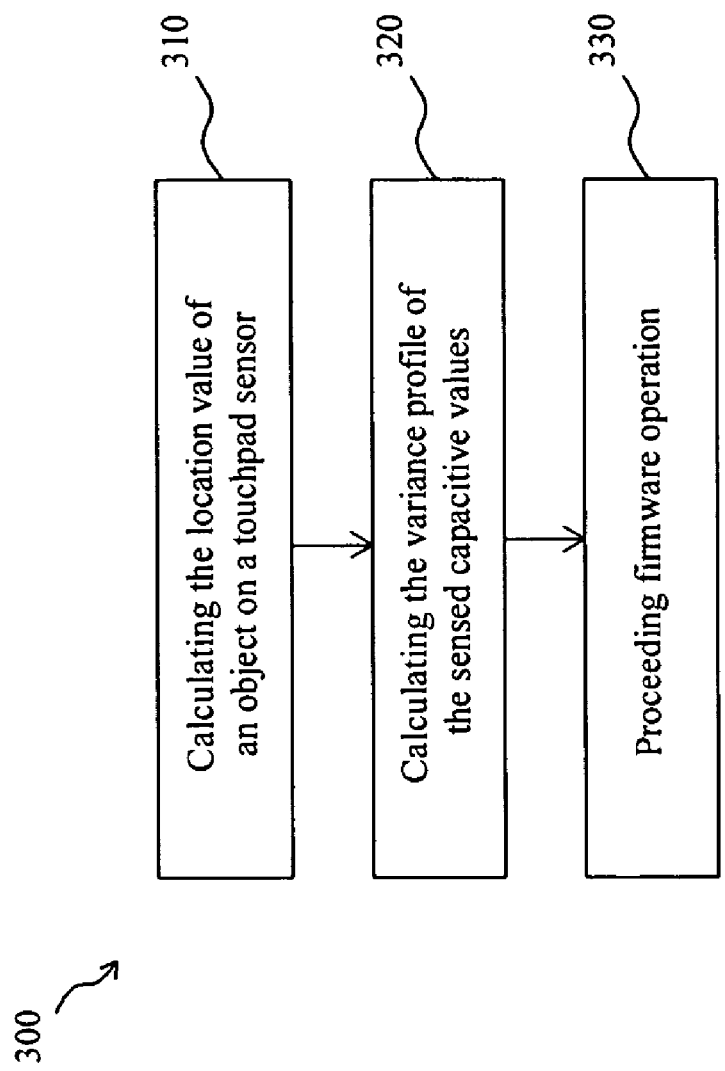
FIG. 9 shows a flowchart in a second embodiment according to the present invention.

FIG. 9 shows a second embodiment according to the present invention. In a flowchart 300 to determine a position where an object touches, location calculation step 310 calculates the position value of the object on the touchpad sensor, distribution analysis step 320 calculates the variance profile of the sensed capacitive values resulted from the traces on a same sensing layer according to the equations 1 and 2, which indicates how the sensed capacitive values of the traces are asymmetrical, and firmware operation step 330 modifies the position value so as to eliminate the offset in the position value resulted from the asymmetrical traces. As a result, the modified position value will match to the real position where the object touches on the touchpad sensor. In one embodiment, the firmware operation step 330 comprises increasing or decreasing the position value based on the variance profile of the sensed capacitive values.

In some other embodiments, two or more of the methods illustrated in the above embodiments may be combined for the compensation to a touchpad sensor, to uniform the sensed capacitive values of the traces in the same or different sensing layers, or to eliminate the offset in the position value.

What is claimed is:

1. A compensation method for sensed capacitive values of an asymmetric touchpad sensor having X and Y traces of non-uniform geometry, comprising the steps of:

calculating base capacitances of a plurality of traces in the asymmetric touchpad sensor to generate a base capacitance profile for determining a distribution of the base capacitances across the touchpad sensor;

analyzing the distribution for determining a substantially non-uniform variance profile of the base capacitances indicative of non-uniform trace sensitivity across the touchpad sensor; and executing a firmware operation based on the variance profile to adaptively modify the sensed capacitive values, the modification being thereby varied in accordance with relative position of the individual non-uniform traces on the touchpad sensor for substantially removing therefrom an offset due to the non-uniform trace sensitivity.

2. The compensation method of claim 1, wherein the step of proceeding a firmware operation comprises the step of carrying out addition/subtraction or multiplication/division operations to the sensed capacitive values.

3. The compensation method of claim 1, wherein the step of proceeding a firmware operation comprises the step of adjusting a charge/discharge frequency for the plurality of traces.

4. The compensation method of claim 3, wherein the step of adjusting a charge/discharge frequency for the plurality of traces comprises the step of increasing the charge/discharge frequency for one or more of the plurality of traces which have greater base capacitances.

5. The compensation method of claim 1, wherein the step of proceeding a firmware operation comprises the step of adjusting a charge/discharge current for the plurality of traces.

6. The compensation method of claim 5, wherein the step of adjusting a charge/discharge current for the plurality of traces comprises the step of increasing the charge/discharge current for one or more of the plurality of traces which have greater base capacitances.

7. The compensation method of claim 1, wherein the plurality of traces are selected from a sensing layer.

8. The compensation method of claim 1, wherein the plurality of traces are selected from at least two sensing layers.

9. A compensation method for sensed capacitive values of an asymmetric touchpad sensor having X and Y traces of non-uniform geometry, comprising the steps of:
    calculating a position value of an object on the asymmetric touchpad sensor;
    calculating a substantially non-uniform variance profile as reference for determining offsets in the sensed capacitive values of a plurality of traces in the touchpad sensor, the substantially non-uniform variance profile being indicative of non-uniform trace sensitivity across the touchpad sensor; and
    executing a firmware operation based on the variance profile to adaptively modify the position value, the modification being thereby varied in accordance with relative position of the individual non-uniform traces on the touchpad sensor for eliminating an offset in the position value due to the non-uniform trace sensitivity.

10. The compensation method of claim 9, wherein the step of proceeding a firmware operation comprises the step of increasing or decreasing the position value.

11. The compensation method of claim 9, wherein the plurality of traces are selected from a sensing layer.

* * * * *